March 23, 1943.  W. A. KURGAS  2,314,503
ARTIFICIAL TOOTH
Filed July 15, 1940  2 Sheets-Sheet 1

INVENTOR:
WALTER A. KURGAS
BY
Roy M Eilers
ATTORNEYS.

March 23, 1943.                    W. A. KURGAS                    2,314,503
                                  ARTIFICIAL TOOTH
                      Filed July 15, 1940                2 Sheets-Sheet 2

INVENTOR:
WALTER A. KURGAS
BY
Roy M. Eilers
ATTORNEYS.

Patented Mar. 23, 1943

2,314,503

UNITED STATES PATENT OFFICE 2,314,503

ARTIFICIAL TOOTH

Walter A. Kurgas, St. Louis, Mo., assignor to E. B. Moore, St. Louis, Mo.

Application July 15, 1940, Serial No. 345,544

3 Claims. (Cl. 32—9)

This invention relates to improvements in interchangeable artificial teeth. More particularly, the invention relates to interchangeable artificial teeth and backings for interchangeable artificial teeth.

It is an object of the present invention to provide an artificial tooth and backing therefor of simple and compact construction.

Interchangeable artificial teeth and backings for interchangeable artificial teeth have been known and used for many years. Most of the teeth and backings that are used today may be classified in three groups, namely, those having "post holes," those having wedges supported on webs, and those having combinations of "post holes" and wedges supported on webs. An objection of this type of tooth and backing is the necessity of making the tooth excessively bulky to secure sufficient mass in the teeth to prevent breaking of the teeth when used in chewing. Teeth with "post holes" must be made rather thick to provide a "post hole" deep enough to receive the pin or stud mounted on the backing, and such a tooth will be too thick to appear natural. Teeth which have grooves to receive a wedge mounted on a web must also be rather thick to provide mass enough to prevent breakage of the tooth by cleavage. Such thick teeth cannot be made to simulate natural teeth and are objectionable for that reason. The teeth that have "post holes," and grooves for wedges mounted on a web must be still thicker and are even more undesirable. The invention provides an interchangeable tooth and backing which can be made to simulate natural teeth and can be made much stronger than the present types of interchangeable artificial teeth. It is, therefore, an object of the invention to provide a tooth and backing for the tooth which will effectively simulate a natural tooth.

To effectuate more perfectly the simulation of natural teeth by artificial ones, the invention provides interchangeable artificial teeth and backings therefor that have only a small amount of metal therein. Teeth formed in this manner can be made to appear to have the translucency characteristic of natural teeth. This construction is especially desirable in incisal teeth since it provides a non-metallic incisal tip that has a very natural appearance. It is, therefore, an object of the invention to provide an interchangeable artificial tooth which has a backing that is not coextensive with the tooth.

Other objects and advantages of the invention will be shown and described in the drawings and accompanying description.

For convenience, the drawings and accompanying description have been drawn to a preferred form of the invention, but it is to be understood that the invention is not limited to the form shown and described in the drawings and accompanying description. The scope and effect of the invention will be defined by the appended claims.

In the drawings, Fig. 1 is a perspective view of a tooth and backing in assembled relation.

Figure 3:
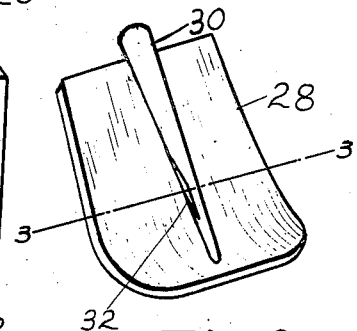
Fig. 3 is a perspective view of the tooth backing shown in Fig. 1 and shows the holding means thereon.

Fig. 3a is a section on line 3—3 of Fig. 3, showing the grooves 32 in the side of the conical projection 30, which projection merges into the surface of the plate 28.

Figure 1:
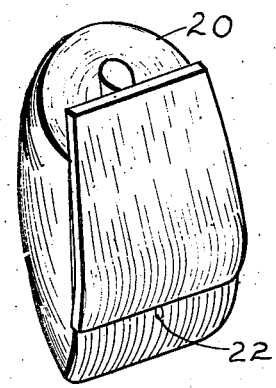
Figure 4:
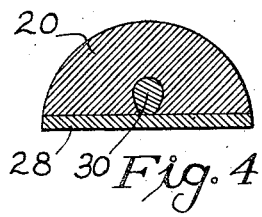

Fig. 4 is a transverse cross-sectional view of the tooth and backing combination shown in Fig. 1.

Figure 2:
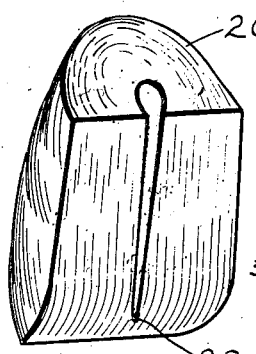
Fig. 2 is a perspective view of the tooth shown in Fig. 1 and shows the lingual surface of the tooth.
Figure 5:
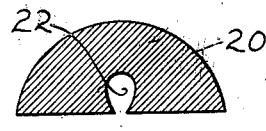

Fig. 5 is a transverse cross-sectional view of the tooth shown in Fig. 2.

Figure 6:

Fig. 6 is a transverse cross-sectional view of the tooth backing shown in Fig. 3.

Figure 7:
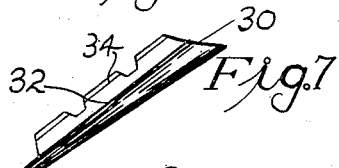

Fig. 7 is a side view of the holding means that is an element of the tooth backing shown in Fig. 3.

Figure 8:
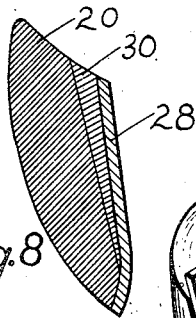

Fig. 8 is a longitudinal cross-sectional view of the tooth and backing combination shown in Fig. 1.

Figure 9:
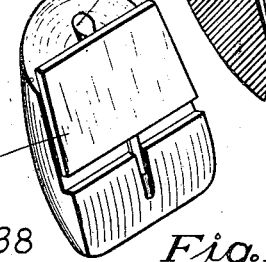

Fig. 9 is a longitudinal cross-sectional view of the tooth shown in Fig. 2.

Figure 10:
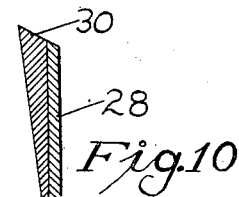

Fig. 10 is a longitudinal cross-sectional view of the tooth backing shown in Fig. 3.

Figure 11:
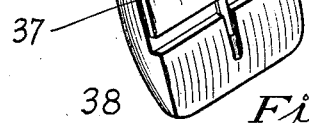
Figure 34:

Fig. 11 is a perspective view of a modified form of the tooth and backing combination shown in Fig. 1.

Figure 12:
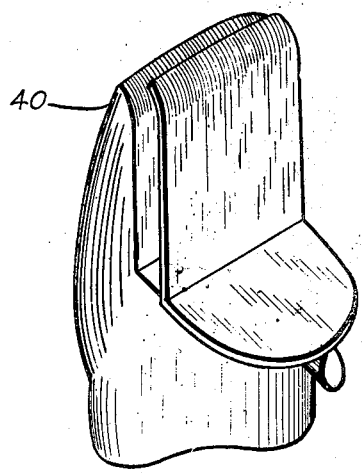

Fig. 12 is a perspective view of a root or saddle type of pontic and a backing for said pontic in assembled relation.

Figure 13:
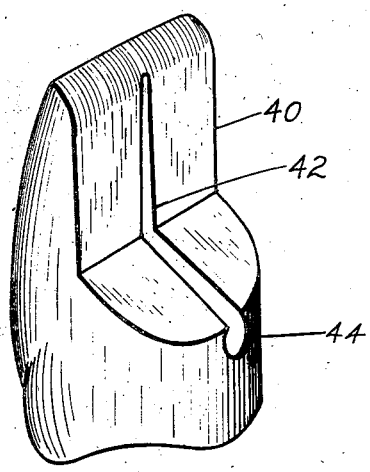

Fig. 13 is a perspective view of the root or saddle type of pontic shown in Fig. 12. This view shows the lingual surface of the pontic.

Figures 14, 15:
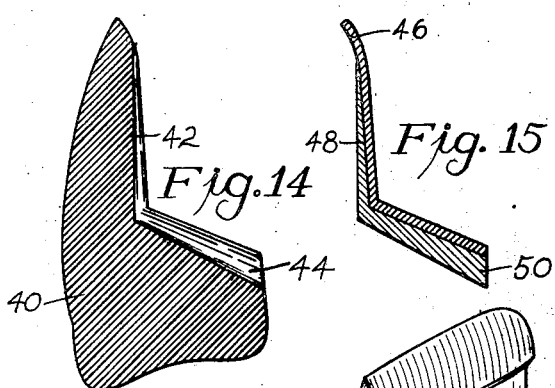

Fig. 14 is a longitudinal cross-sectional view of the pontic shown in Fig. 13.

Fig. 15 is a cross-sectional view of the backing shown in assembled relation with the pontic in Fig. 12.

Figure 16:
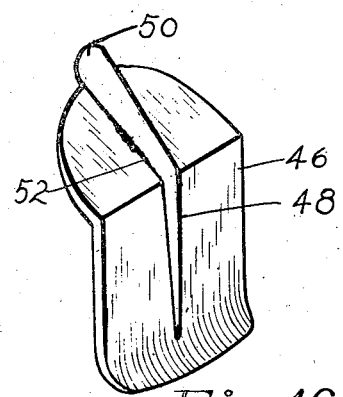

Fig. 16 is a perspective view of the backing to be used with the pontic shown in Fig. 13.

Figure 17:
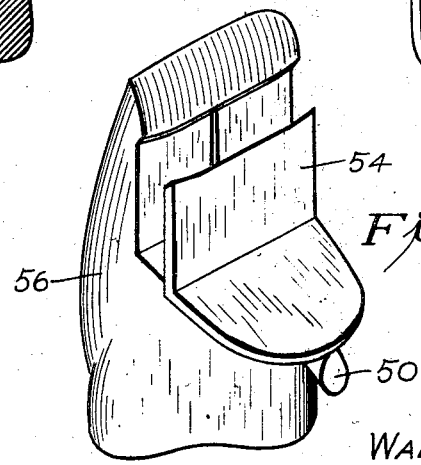

Fig. 17 is a perspective view of a modified form of the root or saddle type of pontic and backing combination shown in Fig. 12.

Referring to the drawings in detail, a tooth facing made in accordance with the principles of the invention is denoted by the numeral 20. The tooth facing 20 has a longitudinally extending groove 22 formed therein that has substantially the shape of a cone. The groove 22 has a relatively large transverse cross-sectional area in the gingival portion of the facing and has a relatively small transverse cross-sectional area in the incisal portion of the tooth facing, and gradually tapers from its large end in the gingival portion of the facing to its small end in the incisal portion of the tooth facing. The groove 22 is formed to become shallower in the incisal portion of the tooth facing than it is in the gingival portion of the facing, and is formed so that it has a smaller transverse dimension at the lingual surface than it has in the body of the facing a short distance from the lingual surface. The tooth facing 20 may be made of a number of compounds, but is preferably made of a compound that closely resembles the texture and color of natural teeth.

The numeral 28 denotes a tooth backing that is created to serve as a backing for tooth facing 20. The tooth backing is secured to bridgework and serves to support the interchangeable artificial tooth facing. The backing may be secured to the bridgework by the usual means. A substantially cone-shaped projection 30 is secured to the backing 28. The projection 30 is a fastening means and cooperates with the groove 22 in tooth facing 20 to hold tooth backing 28 and tooth facing 20 in intimate engagement. The projection 30 may have a groove in each side which would facilitate the assembly of the tooth facing and tooth backing. To mount the ordinary type of artificial tooth facing on its backing, it is necessary meticulously to align the groove in the tooth facing with the projection on the backing, and carefully move the tooth facing into engagement with the backing. Because of space limitations in the human mouth, this procedure can become rather awkward. The provision of grooves 32 on the projection 30 permits a great deal of latitude in the movement of the facing into engagement with the backing. The facing can be moved obliquely toward the backing and will automatically align itself upon engagement with the cone-shaped projection 30 and the grooves 32 thereon. Such an arrangement facilitates the engagement of the tooth facing with the backing. Ordinarily, the projection will be formed integrally with the backing, but it may be made separately and attached to the backing subsequently. Some dentists prefer to make their own tooth backings, and the projection shown in Fig. 7 is created to permit this type of dentist to manufacture backings which can be used with facings that are made in accordance with the principles of the invention. The dentist can procure a holding means similar to that shown in Fig. 7 and incorporate it in a backing of his own manufacture. This can be done in a number of ways such as soldering, casting, brazing, and use of pins, etc. The holding means 30 shown in Fig. 7 has projections 34 thereon that are formed to be incorporated in backings made by individual users and thereby provide additional structural strength for the backing.

A modified form of tooth facing 36 is shown in Fig. 11. This form of tooth facing is similar to that shown in Fig. 2 with the exception that the backing is not coextensive with the lingual face of the tooth facing. The facing has a plane section and a curved section on its lingual surface. The plane section is in the gingival portion and part of the middle portion of the facing, whereas the curved section of the facing is in the incisal portion of the tooth facing. The curved section of the tooth facing forms the incisal tip of the tooth and extends above the level of the plane section. The plane section of the tooth facing engages the backing 37 and is positioned below the edge of the curved section of the facing a distance equal to the thickness of the backing. Such an arrangement permits the engagement of the facing and backing without any raised or depressed portions on the lingual face of the combination of tooth facing and backing. Such a tooth facing provides a porcelain incisal tip and eliminates the metal incisal tip shown in Fig. 1. A facing and backing of this type is desirable because it makes possible the manufacture of a tooth facing that is less artificial and more natural in appearance. The projection on this backing is the same as projection 30, but the backing 37 is shorter in length. If desired, the projection 38 may be shortened so that it does not extend into the porcelain incisal tip. Such a facing and backing would display a minimum of metal and would appear quite natural.

The Figs. 12 through 17 show the invention as it is applied to the type of tooth known as a saddle or root type of pontic. Such a tooth is denoted by the numeral 40 and it has a recess in the root side thereof. This recess is formed by two surfaces, the first of said surfaces being approximately parallel to the buccal surface of the pontic, and the other surface being approximately parallel to the occlusal surface of the pontic. Each of these surfaces has a groove formed therein. The groove 42 is substantially semi-circular in cross-section. Such a groove permits the translation of projection 48, on backing 46, into the groove 42. The groove 44 is formed like the groove 22 in tooth facing 20, is the complement of projection 50 on backing 46, and cooperates with the projection 50 to maintain the pontic and backing in assembled relation. Such an arrangement of grooves and projections permits the sliding of pontic 40 onto backing 46 and holds the pontic in intimate engagement with the backing. Projection 50 on backing 46 may be provided with grooves 52 that are similar to the grooves 32 on projection 30, and permit assembly of the pontic 40 and backing 46 with a minimum amount of difficulty.

Fig. 17 shows a pontic 56 and backing 54 that are modified forms of pontic 40 and backing 46. The pontic and backing have been modified to provide a metal backing that is not coextensive with the lingual face of the recess in the root side of the pontic. Such a pontic materially reduces the amount of metal used in the mouth and tends to permit the manufacture of teeth that have a more natural and less artificial appearance.

The use of facings, pontics, and backings made in accordance with the principles of the invention materially reduces the cross-sectional area necessary in the tooth. The reduction of the cross-sectional area of the tooth permits the use of smaller and more life-like teeth than has heretofore been possible. The provision of such a simple and compact fastening structure permits more faithful reproduction of the natural characteristics, markings, indentations, flattened areas, pitting, check marks, apparent translucency, decalcification areas, and a number of other characteristics found in natural teeth. In addition, the provision of backings that are not coextensive with the surfaces which they engage, materially reduces the artificial appearance of the interchangeable artificial teeth.

What I claim is:

1. An interchangeable artificial tooth and backing assembly therefor comprising a tooth facing in simulation of a natural tooth, said tooth facing having a substantially conical groove extending longitudinally thereof, said groove having a smaller transverse cross-sectional area in the incisal portion of the tooth facing than it has in the gingival portion of the facing, said groove having a smaller transverse dimension at the lingual surface than it has in the corresponding portion of the body of the facing immediately below the lingual surface, and a backing for said tooth facing having a substantially conical projection thereon, said projection being substantially the complement of the groove in the facing, said projection having grooves thereon oblique to the plane of the tooth backing, said grooves on the said projection being arranged to receive the edges of the conical groove in the facing when the facing is moved obliquely toward the plane of the tooth backing and to align automatically the tooth facing and backing for movement into engagement with each other, said projection being adapted to cooperate with the groove in the tooth facing to hold the facing and the backing in intimate engagement with each other.

2. An interchangeable artificial tooth and backing assembly therefor comprising a tooth facing in simulation of a natural tooth, said tooth facing having a substantially conical groove extending longitudinally thereof, said groove having a smaller transverse cross-sectional area in the incisal portion of the tooth facing than it has in the gingival portion of the facing, said groove having a smaller transverse dimension at the lingual surface than it has in the corresponding portion of the body of the facing immediately below the lingual surface, and a backing for said tooth having a substantially conical projection thereon, said projection being substantially the complement of the groove in the facing, said projection being immediately adjacent and actually abutting the surface of the said backing, said projection being adapted to cooperate with the groove in the tooth facing to hold the tooth and the backing in intimate engagement with each other.

3. An interchangeable artificial tooth and backing assembly therefor comprising a tooth facing in simulation of a natural tooth, said tooth facing having a substantially conical groove extending longitudinally thereof, said groove having a smaller transverse cross-sectional area in the incisal portion of the tooth facing than it has in the gringival portion of the facing, said groove having a smaller transverse dimension at the lingual surface than it has in the corresponding portion of the body of the facing immediately below the lingual surface, and a backing for said tooth facing having a substantially conical projection thereon, said projection being substantially the complement of the groove in the facing, said projection having a groove therein that is oblique to the plane of the tooth facing and is oblique to the axis of the said projection, said groove in the projection starting at the side of the projection in the incisal portion of the tooth backing and terminating near the surface of the backing plate in the gingival portion of the tooth backing, said groove in the projection being adapted to cooperate with the edges of the groove in the facing to align automatically the tooth facing and backing for movement into engagement with each other, said projection being adapted to cooperate with the groove in the tooth facing to hold the facing and the backing in intimate engagement with each other.

WALTER A. KURGAS.